US012780435B2

(12) United States Patent
Ghandour et al.

(10) Patent No.: US 12,780,435 B2
(45) Date of Patent: Nov. 3, 2026

(54) LOSS OF LOAD PATH DETECTION SYSTEM FOR AIRCRAFT PROPULSION SYSTEM NACELLE AND METHOD FOR USING SAME

(71) Applicant: Rohr, Inc., Chula Vista, CA (US)

(72) Inventors: Imad Ghandour, San Diego, CA (US); Luke Robinson, San Diego, CA (US); Joshua Pritekel, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 55 days.

(21) Appl. No.: 18/797,093

(22) Filed: Aug. 7, 2024

(65) Prior Publication Data

US 2025/0051021 A1 Feb. 13, 2025

Related U.S. Application Data

(60) Provisional application No. 63/531,121, filed on Aug. 7, 2023.

(51) Int. Cl.
*B64D 29/00* (2006.01)
*B64D 45/00* (2006.01)

(52) U.S. Cl.
CPC ............. *B64D 29/00* (2013.01); *B64D 45/00* (2013.01); *B64D 2045/0085* (2013.01)

(58) Field of Classification Search
CPC ............................................. B64D 2045/0085
See application file for complete search history.

(56) References Cited

U.S. PATENT DOCUMENTS

| | | | | |
|---|---|---|---|---|
| 10,676,215 | B2 | 6/2020 | Raimarckers | |
| 11,345,480 | B2 | 5/2022 | Mertes | |
| 2009/0173823 | A1 | 7/2009 | Shetzer | |
| 2017/0369188 | A1 | 12/2017 | Bulumulla | |
| 2020/0124090 | A1* | 4/2020 | Poupon | B64C 9/02 |
| 2021/0347494 | A1 | 11/2021 | Aguilar Ante | |

OTHER PUBLICATIONS

EP Search Report for EP Patent Application No. 24193447.0 dated Jan. 2, 2025.

* cited by examiner

*Primary Examiner* — Erin D Bishop
*Assistant Examiner* — Alex B Griffin
(74) *Attorney, Agent, or Firm* — Getz Balich LLC

(57) ABSTRACT

An assembly for an aircraft propulsion system includes a gas turbine engine, a nacelle housing the gas turbine engine, a load cell disposed on the nacelle, and a controller. The load cell is configured to measure a loading of the nacelle at a structural load path position of the nacelle. The controller is connected in signal communication with the load cell. The controller is configured to compare an engine output parameter of the gas turbine engine to a threshold engine output parameter to identify the engine output parameter is greater than or less than the threshold engine output parameter, compare the measured loading of the load cell to a zero-load value for the structural load path position to identify the measured loading is greater than or less than the zero-load value, and identify a structural load path failure for the structural load path position.

14 Claims, 5 Drawing Sheets

LOSS OF LOAD PATH DETECTION SYSTEM FOR AIRCRAFT PROPULSION SYSTEM NACELLE AND METHOD FOR USING SAME

This application claims priority to U.S. Patent Appln. Ser. No. 63/531,121 filed Aug. 7, 2023, which is hereby incorporated herein by reference in its entirety.

BACKGROUND

1. Technical Field

This disclosure relates generally to aircraft propulsion system nacelles and, more particularly, to systems and methods for detecting a structural load path failure for an aircraft propulsion system nacelle.

2. Background Information

An aircraft propulsion system may include a nacelle forming an exterior housing of the propulsion system. Components which form structural load paths of nacelles are subject to wear, degradation, and/or failure, for example as a result of use and cyclic loading. Various processes for evaluating nacelle structural load paths are known in the art. For example, periodic visual inspections may be performed to identify some instances of nacelle structural load path wear, degradation, and/or failure, however, some other instances may be difficult or impossible to identify using known processes. Accordingly, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes a gas turbine engine, a nacelle housing the gas turbine engine, a load cell disposed on the nacelle, and a controller. The load cell is configured to measure a loading of the nacelle at a structural load path position of the nacelle. The controller is connected in signal communication with the load cell. The controller includes a processor in communication with a non-transitory memory storing instructions, which instructions when executed by the processor, cause the processor to compare an engine output parameter of the gas turbine engine to a threshold engine output parameter to identify the engine output parameter is greater than or less than the threshold engine output parameter, in response to identifying the engine output parameter is greater than the threshold engine output parameter, compare the measured loading of the load cell to a zero-load value for the structural load path position to identify the measured loading is greater than or less than the zero-load value, and in response to identifying the measured loading is less than the zero-load value, identify a structural load path failure for the structural load path position.

In any of the aspects or embodiments described above and herein, the instructions, when executed by the processor, may further cause the processor to generate a warning for the structural load path failure at the structural load path position in response to identifying the measured loading is less than the zero-load value.

In any of the aspects or embodiments described above and herein, the nacelle may include attachment hardware at the structural load path position. The load cell may be disposed on the attachment hardware.

In any of the aspects or embodiments described above and herein, the nacelle may include a latch assembly and the latch assembly may include the attachment hardware.

In any of the aspects or embodiments described above and herein, the gas turbine engine may include a rotational assembly. The rotational assembly may include a propulsor. The engine output parameter may be a rotation speed of the rotational assembly.

In any of the aspects or embodiments described above and herein, the threshold engine output parameter may be greater than or equal to 50 percent of a rated value for the rotation speed.

In any of the aspects or embodiments described above and herein, the threshold engine output parameter may be greater than or equal to 75 percent of the rated value for the rotation speed.

In any of the aspects or embodiments described above and herein, the zero-load value may be a predetermined value stored in the memory.

In any of the aspects or embodiments described above and herein, the instructions, when executed by the processor, may further cause the processor to determine the zero-load value for the structural load path position using the measured loading.

In any of the aspects or embodiments described above and herein, the instructions, when executed by the processor, further cause the processor to determine the zero-load value for the structural load path position using the measured loading when the gas turbine engine is operating and the engine output parameter is less than the threshold engine output parameter.

According to another aspect of the present disclosure, a method for identifying a structural load path failure for a nacelle of an aircraft propulsion system includes measuring a loading of the nacelle at a structural load path position of the nacelle, comparing an engine output parameter of a gas turbine engine of the aircraft propulsion system to a threshold engine output parameter to identify the engine output parameter is greater than or less than the threshold engine output parameter, in response to identifying the engine output parameter is greater than the threshold engine output parameter, comparing the measured loading to a zero-load value for the structural load path position to identify the measured loading is greater than or less than the zero-load value, and in response to identifying the measured loading is less than the zero-load value, identifying the structural load path failure for the structural load path position.

In any of the aspects or embodiments described above and herein, the engine output parameter may be one of a rotation speed, a torque, a shaft horsepower, a temperature, or a fuel flow rate for the gas turbine engine.

In any of the aspects or embodiments described above and herein, measuring the loading of the nacelle at the structural load path position of the nacelle may include measuring the loading of the nacelle at the structural load path position using a load cell disposed at the structural load path position.

In any of the aspects or embodiments described above and herein, the method may further include determining the zero-load value for the structural load path using the measured loading.

In any of the aspects or embodiments described above and herein, the method may further include generating a warning for the structural load path failure at the structural load path position in response to identifying the measured loading is less than the zero-load value.

According to another aspect of the present disclosure, an assembly for an aircraft propulsion system includes a nacelle, a load cell disposed on the nacelle, and a controller. The load cell is configured to measure a loading of the nacelle at a structural load path position of the nacelle. The controller is connected in signal communication with the load cell. The controller includes a processor in communication with a non-transitory memory storing instructions, which instructions when executed by the processor, cause the processor to determine a zero-load value for the structural load path position using the measured loading, compare the measured loading of the load cell to the zero-load value for the structural load path position to identify the measured loading is greater than or less than the zero-load value, and in response to identifying the measured loading is less than the zero-load value, identify a structural load path failure for the structural load path position.

In any of the aspects or embodiments described above and herein, the instructions, when executed by the processor, may further cause the processor to generate a warning for the structural load path failure at the structural load path position in response to identifying the measured loading is less than the zero-load value.

In any of the aspects or embodiments described above and herein, the nacelle may include attachment hardware at the structural load path position. The load cell may be disposed on the attachment hardware.

In any of the aspects or embodiments described above and herein, the nacelle may include a fan cowl section including a first cowl door, a second cowl door, and a latch assembly configured to selectively retain the first cowl door and the second cowl door together in a closed position. The load cell may be disposed on the latch assembly.

In any of the aspects or embodiments described above and herein, the nacelle may include a thrust reverser section. The thrust reverser section may include a fixed thrust reverser structure, a moveable thrust reverser structure, and a locking assembly for selectively retaining the moveable thrust reverser structure in a fixed position relative to the first thrust reverser structure. The load cell may be disposed on the locking assembly.

The present disclosure, and all its aspects, embodiments and advantages associated therewith will become more readily apparent in view of the detailed description provided below, including the accompanying drawings.

DETAILED DESCRIPTION

Figure 1:
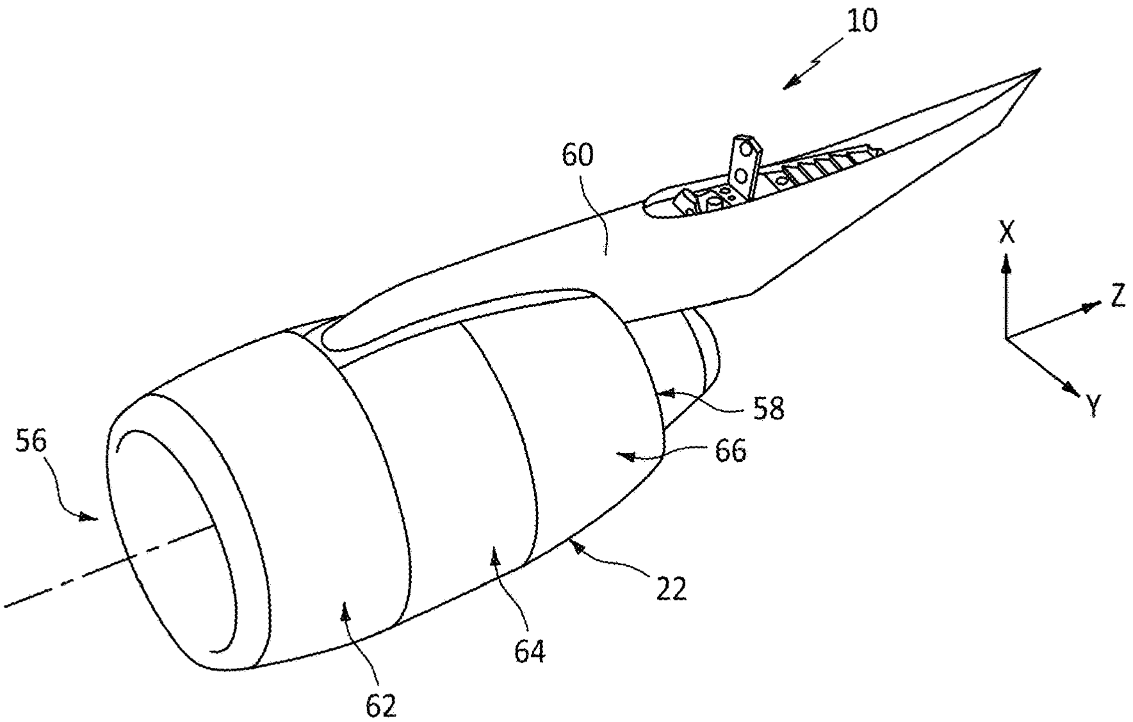
FIG. 1 illustrates a perspective view of propulsion system for an aircraft, in accordance with one or more embodiments of the present disclosure.
Figure 2:
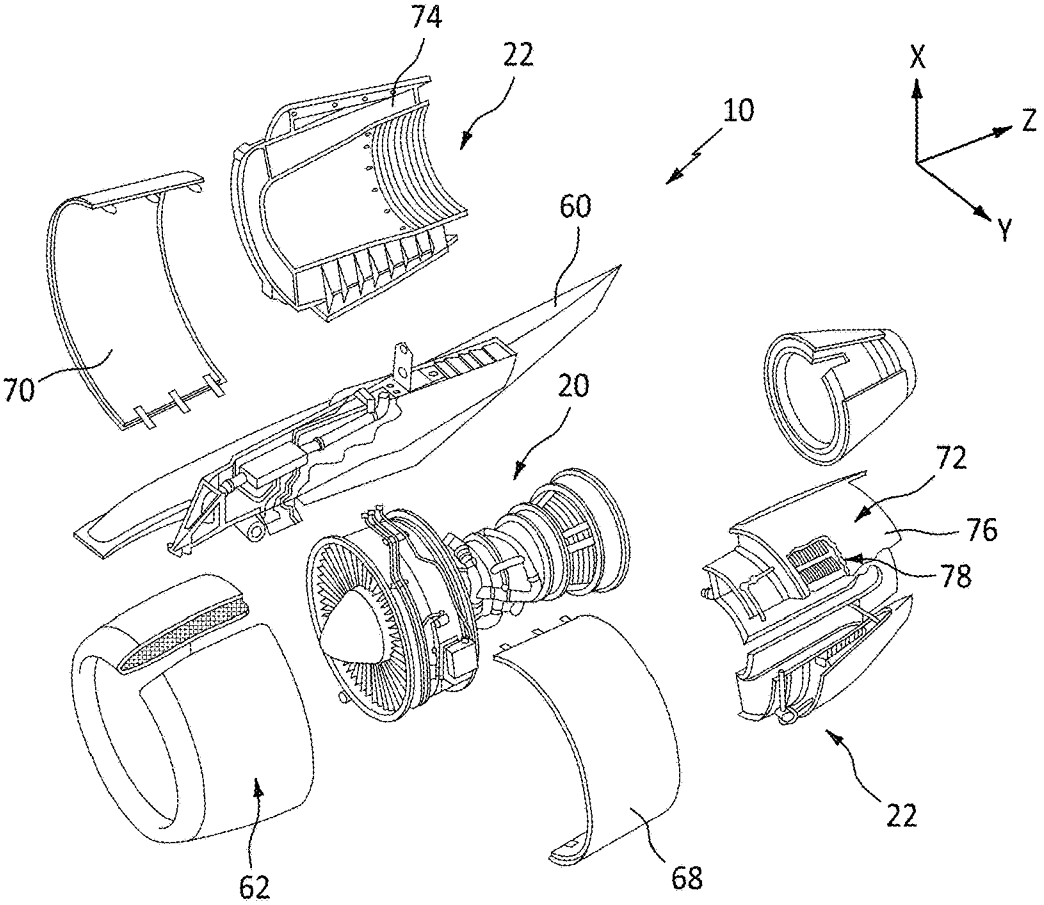
FIG. 2 illustrates an exploded, perspective view of the propulsion system of FIG. 1, in accordance with one or more embodiments of the present disclosure.
Figure 3:
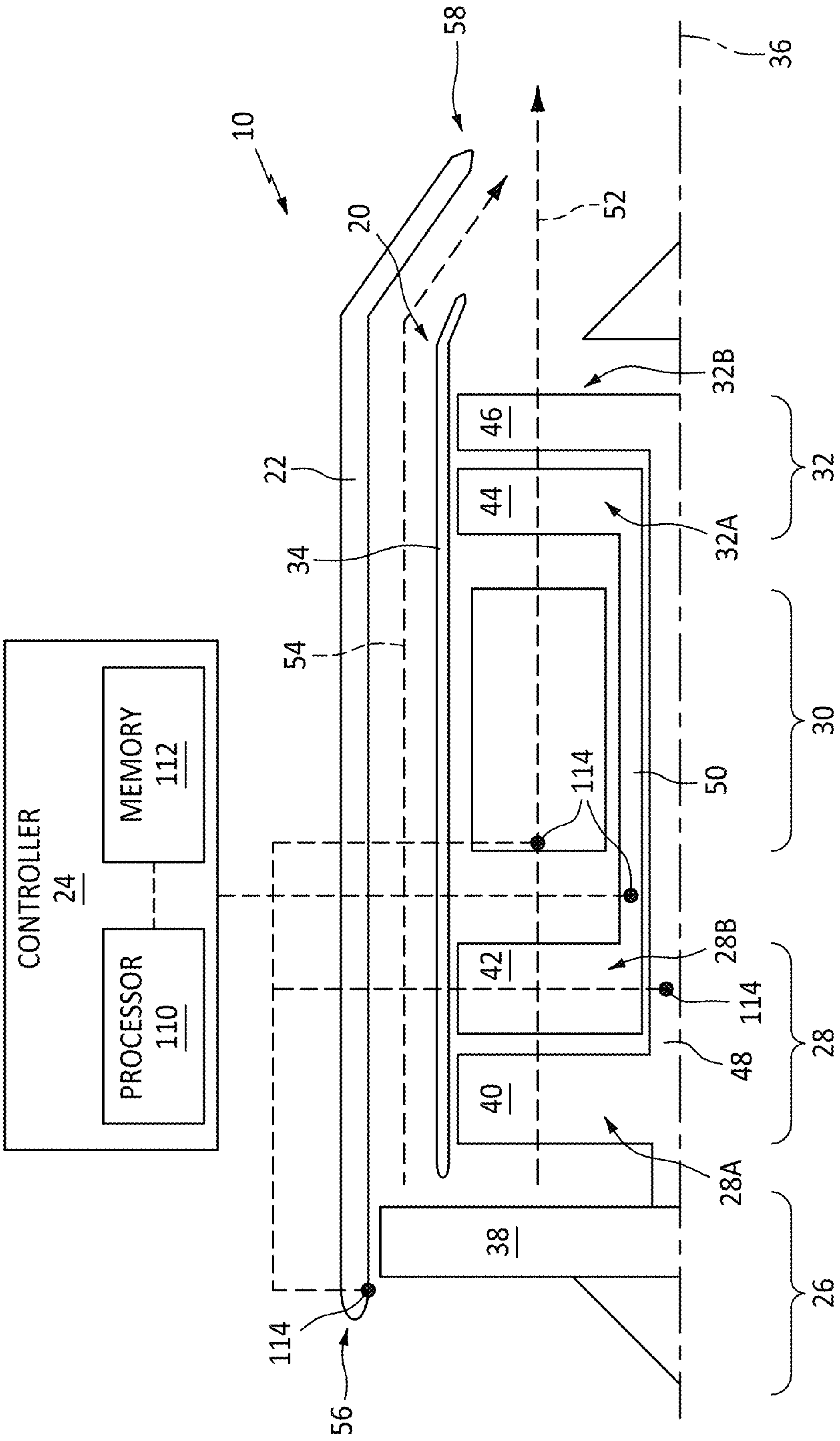
FIG. 3 schematically illustrates a cutaway, side view of a gas turbine engine for an aircraft propulsion system, in accordance with one or more embodiments of the present disclosure.

FIGS. 1-3 illustrate a propulsion system 10 for an aircraft. The propulsion system 10 of FIGS. 1-3 includes a gas turbine engine 20, a nacelle 22, and a controller 24. The gas turbine engine 20 of FIGS. 1-3 is configured as a multi-spool turbofan gas turbine engine for the aircraft propulsion system 10. However, it should be understood that aspects of the present disclosure may be equally applicable to other configurations of gas turbine engine propulsion systems (e.g., those including a turboshaft gas turbine engine, a turboprop gas turbine engine, a turbojet gas turbine engine, a propfan gas turbine engine, an open rotor gas turbine engine, etc.) as well as other types of propulsion systems which do not include gas turbine engines (e.g., an electric-fan propulsion system, an electric-prop propulsion system, etc.).

FIG. 3 illustrates a cutaway, side view of the propulsion system 10. The gas turbine engine 20 of FIG. 3 includes a fan section 26, a compressor section 28, a combustor section 30, a turbine section 32, and an engine static structure 34. The gas turbine engine 20 sections 26, 28, 30, and 32, of FIG. 3 are arranged sequentially along an axial centerline 36 (e.g., a rotational axis) of the gas turbine engine 20. The compressor section 28 may include a low-pressure compressor (LPC) section 28A and a high-pressure compressor (HPC) section 28B. The turbine section 32 may include a high-pressure turbine (HPT) section 32A and a low-pressure turbine (LPT) section 32B. The present disclosure, however, is not limited to the particular gas turbine engine 20 configuration of FIG. 3. For example, aspects of the present disclosure may also be applicable to propulsion system gas turbine engines having single-spool and three-spool configurations.

Each of the gas turbine engine 20 sections 26, 28A, 28B, 32A, and 32B includes a bladed rotor 38, 40, 42, 44, 46. The fan rotor 38 and the LPC rotor 40 are connected to and driven by the LPT rotor 46 through a shaft 48. The HPC rotor 42 is connected to and driven by the HPT rotor 44 through a shaft 50. The shaft 48 and the shaft 50 are concentrically disposed relative to the axial centerline 36 and configured for rotation about the axial centerline 36 relative to the engine static structure 34.

In operation, the fan rotor 38 draws and directs ambient air into the propulsion system 10. The air may be divided into a core flow path 52 and a bypass flow path 54. The core flow path 52 extends axially along the axial centerline 36 within the gas turbine engine 20 and through the compressor section 28, the combustor section 30, and the turbine section 32. The core air is compressed by the LPC rotor 40 and the HPC rotor 42 and directed into a combustion chamber of a combustor (e.g., an annular combustor) in the combustor section 30. Fuel is injected into the combustion chamber through one or more fuel injectors and mixed with the compressed core air to provide a fuel-air mixture. This fuel-air mixture is ignited and combustion products thereof flow through and sequentially cause the HPT rotor 44 and the LPT rotor 46 to rotate. The rotation of the HPT rotor 44 and the LPT rotor 46 respectively drive rotation of the HPC rotor 42 and the LPC rotor 40. The rotation of the LPT rotor 46 also drives rotation of the fan rotor 38. The bypass flow path 54 extends axially along the axial centerline 36 and between the gas turbine engine 20 and the nacelle 22.

The nacelle 22 is configured to house and provide an aerodynamic cover for the gas turbine engine 20. The nacelle 22 extends axially along the axial centerline 36 between and to an upstream end 56 (e.g., an axially forward end) of the nacelle 22 and a downstream end 58 (e.g., an axially aft end) of the nacelle 22. The nacelle 22 extends circumferentially about (e.g., completely around) the axial centerline 36. The nacelle 22 may include or otherwise be mounted to a pylon 60 (e.g., an engine mount structure) configured to mount the nacelle 22, and thereby the propulsion system 10, to an aircraft wing or fuselage. The nacelle 22 of FIGS. 1 and 2 includes an air inlet section 62, a fan cowl section 64, and a thrust reverser section 66 arranged sequentially along the axial centerline 36. The air inlet section 62 is disposed at (e.g., on, adjacent, or proximate) the upstream end 56. The fan cowl section 64 is disposed between (e.g., axially between) the air inlet section 62 and the thrust reverser section 66. The thrust reverser section 66 is disposed at (e.g., on, adjacent, or proximate) the downstream end 58.

The fan cowl section 64 is configured to generally surround the fan rotor 38. The fan cowl 64 of FIGS. 1 and 2 includes a first cowl door 68 and a second cowl door 70. Each of the first cowl door 68 and the second door 70 may be hingedly coupled to the pylon 60 or to a fixed portion of the nacelle 22 (e.g., the fan cowl section 64) to facilitate access to internal components of the propulsion system 10 and its gas turbine engine 20. Each of the first cowl door 68 and the second cowl door 70 is pivotable between an open position and a closed position. In the closed position, the first cowl door 68 and the second cowl door 70 form a substantially continuous exterior surface of the fan cowl section 64 (e.g., the first cowl door 68 and the second cowl door 70 are positioned for flight). The first cowl door 68 and the second cowl door 70 may be selectively latched together in the closed position by one or more latch assemblies, as will be discussed in further detail. In the open position, the first cowl door 68 and the second cowl door 70 may be in a position other than the closed position (e.g., a partially open position or a fully open position).

The thrust reverser section 66 may include a first half 72 (e.g., a left half) and a second half 74 (e.g., a right half). All or portions of the first half 72 and the second half 74 may be movable (e.g., axially translatable, rotatable, etc.) to redirect gas flow along the bypass flow path and/or the core flow path to provide deceleration (e.g., reverse thrust) for an aircraft on which the propulsion system 10 is mounted. For example, the thrust reverser section 66 of FIG. 2 includes a translating sleeve 76 forming a portion of an exterior of the thrust reverser section 66. The translating sleeve 66 is axially translatable along the axial centerline 36 between a stowed position (e.g., an axially forward position) and a deployed position (e.g., an axially aft position). In the stowed position, the translating sleeve 66 covers one or more cascade arrays 78 of the thrust reverser section 66. In the deployed position, the translating sleeve 66 uncovers the cascade arrays 78. In this deployed position, air from the gas turbine engine 20 (e.g., air flow along the bypass flow path 54) is directed through the cascade arrays 78 in a forward direction to generate reverse thrust for the propulsion system 10.

The controller 24 includes a processor 110 connected in signal communication with memory 112. The processor 110 may include any type of computing device, computational circuit, processor(s), CPU, computer, or the like capable of executing a series of instructions that are stored in the memory 112. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the controller 24 to accomplish the same algorithmically and/or by coordination of propulsion system 10 components. The memory 112 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 24. The controller 24 may include, or may be in communication with, an input device that enables a user to enter data and/or instructions, and may include, or be in communication with, an output device configured, for example to display information (e.g., a visual display or a printer), or to transfer data, etc. Communications between the controller 24 and other electrical and/or electronic components (e.g., other processing and/or control systems, sensors, etc.) may be via a hardwire connection or via a wireless connection. A person of skill in the art will recognize that portions of the controller 24 may assume various forms (e.g., digital signal processor, analog device, etc.) capable of performing the functions described herein.

The controller 24 may form or otherwise be part of an electronic engine controller (EEC) for the gas turbine engine 20. The EEC may control operating parameters of the gas turbine engine 20 including, but not limited to, fuel flow, stator vane position (e.g., variable compressor inlet guide vane (IGV) position), compressor air bleed valve position, shaft (e.g., shaft 48 and/or shaft 50 torque and/or rotation speed, etc. so as to control an engine power or performance of the gas turbine engine 20. The EEC may modulate fuel flow to the combustor of the combustor section 30 to obtain a desired output power of the gas turbine engine 20. The controller 24 may be connected in signal communication with or otherwise configured to receive a signal from one or more sensors 114 to measure or otherwise determine an engine output parameter of the gas turbine engine 20 such as, but not limited to, shaft 48 rotation speed (N1), shaft 50 rotation speed (N2), air inlet temperature corrected shaft 48 rotation speed and/or shaft 50 rotation speed (N1C, N2C), shaft 48 torque, shaft 50 torque, shaft 48 shaft horsepower (SHP), shaft 50 SHP, an interstage turbine temperature (ITT), and combustor fuel flow rate. In some embodiments, the EEC may be part of a full authority digital engine control (FADEC) system for the gas turbine engine 20. The controller 24 may be connected in signal communication with one or more electronic control systems of an aircraft on which the propulsion system 10 is mounted.

Figure 4:
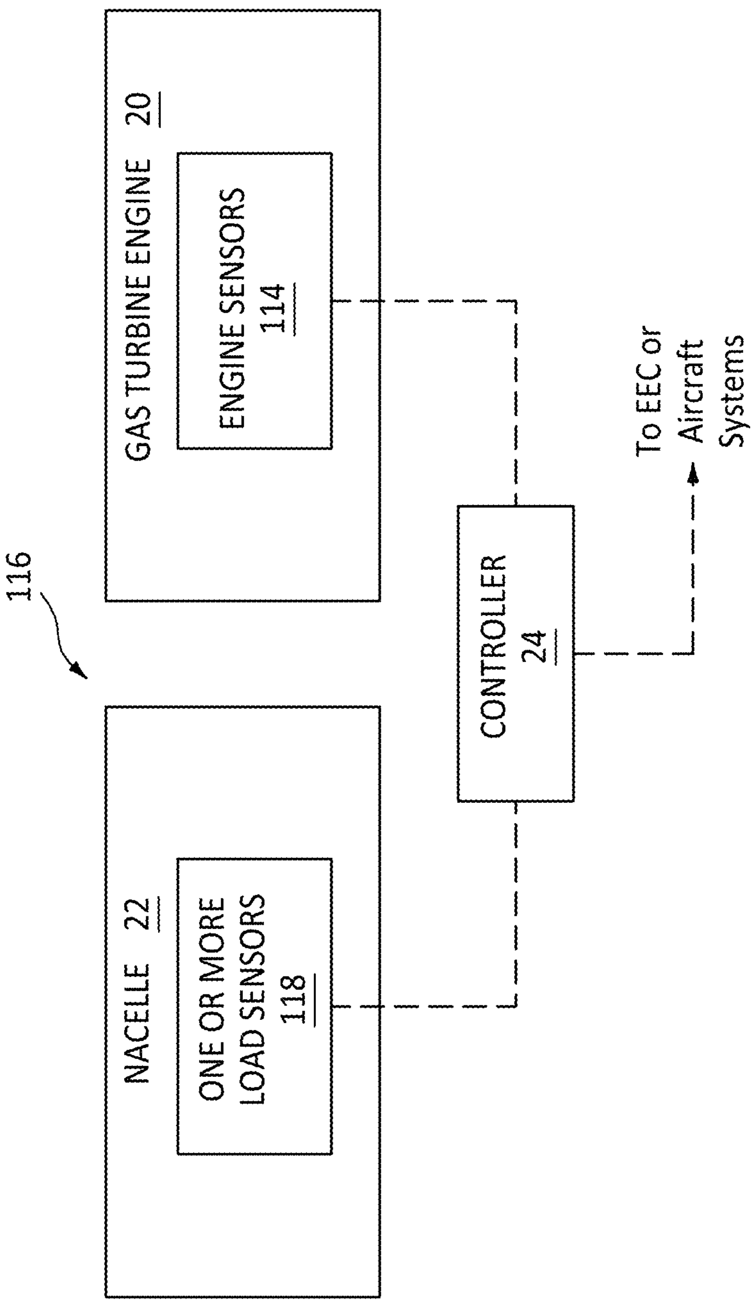
FIG. 4 illustrates a block diagram of a loss of load path detection (LLPD) system for a propulsion system nacelle, in accordance with one or more embodiments of the present disclosure.

FIG. 4 illustrates a block diagram for a loss of load path detection (LLPD) system 116. The LLPD system 116 may include the controller 24 (e.g., the controller 24 may be a dedicated component of the LLPD system 116). Alternatively, the LLPD system 116 may be connected in signal communication with the controller 24, which controller 24 may execute, monitor, or control one or more other propulsion system 10 functions. The LLPD system 116 may operate to identify a presence or an absence of a failure in one or more structural load paths of the nacelle 22. In particular, the LLPD system 116 may identify latent structural load path failures for the nacelle 22. Conventional practices for identifying structural load path failures involve periodic visual inspections by aircraft maintenance personnel. However, these visual inspections are time consuming. Moreover, some latent structural load path failures may be difficult or impossible to identify using conventional visual inspection practices or using conventional latch position systems for identifying a latch or unlatched condition of a latch assembly. Examples of latent structural load path failures include, but are not limited to, actuator rod end failures leading to disconnect, thrust reverser locking element failures, thrust reverser primary lock hook failure, or other failure upstream of latch closure indications, or a hook locking element failure.

The LLPD system 116 of FIG. 4 includes one or more load cells 118 disposed on the nacelle 22. The load cells 118 may be installed in structural load paths of the nacelle 22 to identify a failure of one or more of the structural load paths. The load cells 118 are configured to convert a force (e.g., a tension, a compression, a pressure, or a torque) into an electrical signal. For example, the load cells 118 may have a strain gauge or other force transducer configuration. The load cells 118 may be incorporated into or otherwise formed by attachment hardware (e.g., mechanical fasteners, insert fittings, mounting brackets or other structures, locking bodies, etc.) or other structural load path components of the nacelle 22. The present disclosure, however, is not limited to any particular configuration of the load cells 118. The load cells 118 are connected in signal communication with the controller 24 to provide a signal representative of structural load path loading to the controller 24.

Figure 5:
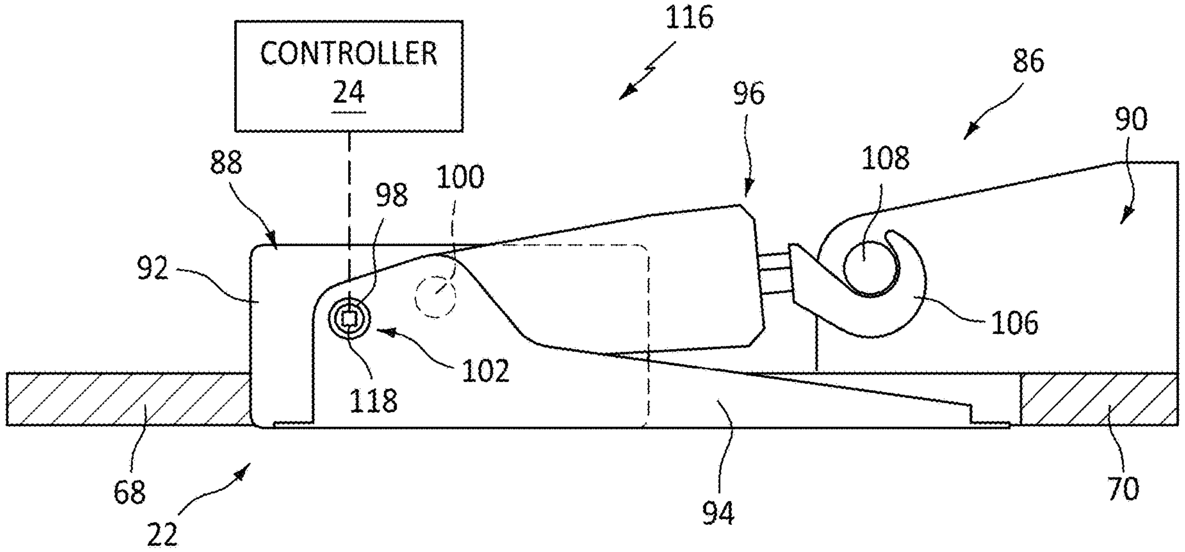
FIG. 5 schematically illustrates a cutaway view of a latch assembly for a fan cowl section of a propulsion system nacelle, in accordance with one or more embodiments of the present disclosure.

FIG. 5 illustrates a first example of an application of the LLPD system 116 and the load cells 118 on a portion of the nacelle 22. FIG. 5 illustrates a cutaway, side view of one of a latch assembly 86 for the first cowl door 68 and the second cowl door 70 (see FIG. 2). The latch assembly 86 of FIG. 5 includes a first latch assembly portion 88 and a second latch assembly portion 90. The first latch assembly portion 88 and the second latch assembly portion 90 are shown in FIG. 5 in an engaged condition. The first latch assembly portion 88 includes a housing 92, a handle 94, a latch 96, and a pin 98. The housing 92 is fixedly mounted to the first cowl door 68. The handle 94 is pivotably mounted to the housing 92 at a first pivot location 100. The latch 96 is pivotably mounted to the handle 94 at a second pivot location 102 by the pin 98 (e.g., a cylindrical body). The latch 96 includes a latch hook 106. The second latch assembly portion 90 includes a keeper 108. The latch 96 is pivotable about the pin 98, by operation of the handle 94, to selectively engage the hook 106 with the keeper 108 or to selectively disengage the hook 106 from the keeper 108. The load cell 118 of FIG. 5 is disposed on or embedded within the pin 98 to measure loading experienced by the latch assembly 86 while holding the first cowl door 68 and the second cowl door 70 together in their respective closed positions. Additional details of the incorporation of a load cell with a latch assembly may be found, for example, in U.S. Patent Publication NO. 2009/0173823, the disclosure of which is hereby incorporated herein by reference in its entirety.

Figure 6:
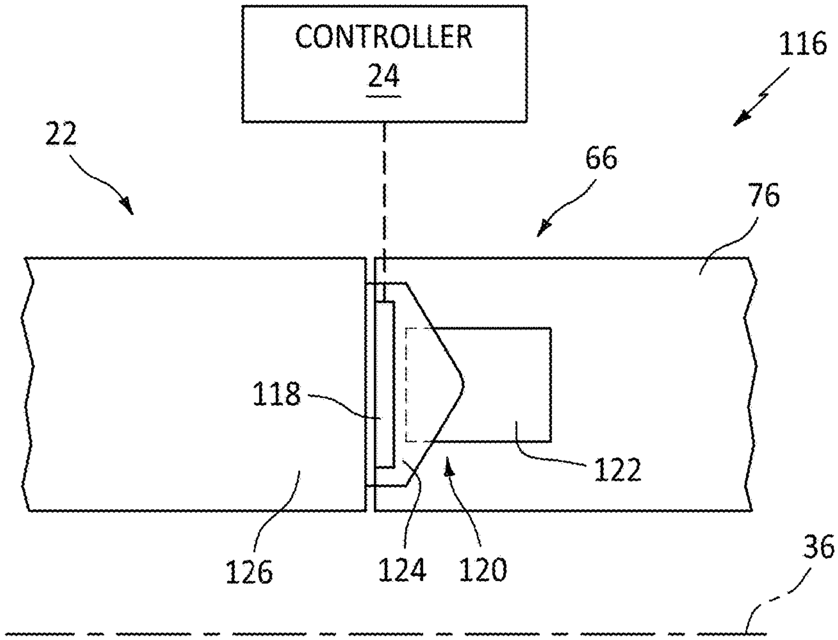
FIG. 6 schematically illustrates a cutaway view of a thrust reverser section of a propulsion system nacelle including a locking actuator assembly, in accordance with one or more embodiments of the present disclosure.

FIG. 6 illustrates a second example of an application of the LLPD system 116 and the load cells 118 on a portion of the nacelle 22. FIG. 6 illustrates a cutaway, side view of a portion of the thrust reverser section 66 including the translating sleeve 76 and a locking actuator assembly 120. The locking actuator assembly 120 includes a locking actuator 122 and an actuator mounting body 124. The locking actuator 122 is configured to selectively engage the translating sleeve 76. With the translating sleeve 76 in the stowed position (e.g., an axially forward position), the locking actuator 122 engages the translating sleeve 76 to lock the translating sleeve in the stowed position. When translation of the translating sleeve 76 from the stowed position to the deployed position is desired (e.g., during aircraft landing conditions), the locking actuator 122 disengages the translating sleeve 76 to allow the translating sleeve 76 to translate to the deployed position. The actuator mounting body 124 fixedly mounts the locking actuator 122 to a fixed structure 126 of the thrust reverser section 66. For example, the actuator mounting body 124 may be configured as a bracket or other attachment hardware for fixedly mounting the locking actuator 122. The fixed structure 126 may include or otherwise be formed by a torque box, a casing, or another fixed structure of the thrust reverser section 66 positioned axially adjacent the translating sleeve 76. The load cell 118 of FIG. 6 is disposed on or embedded within the actuator mounting body 124 to measure loading experienced by the locking actuator assembly 120 while retaining the translating sleeve 76 in the stowed position.

Figure 7:
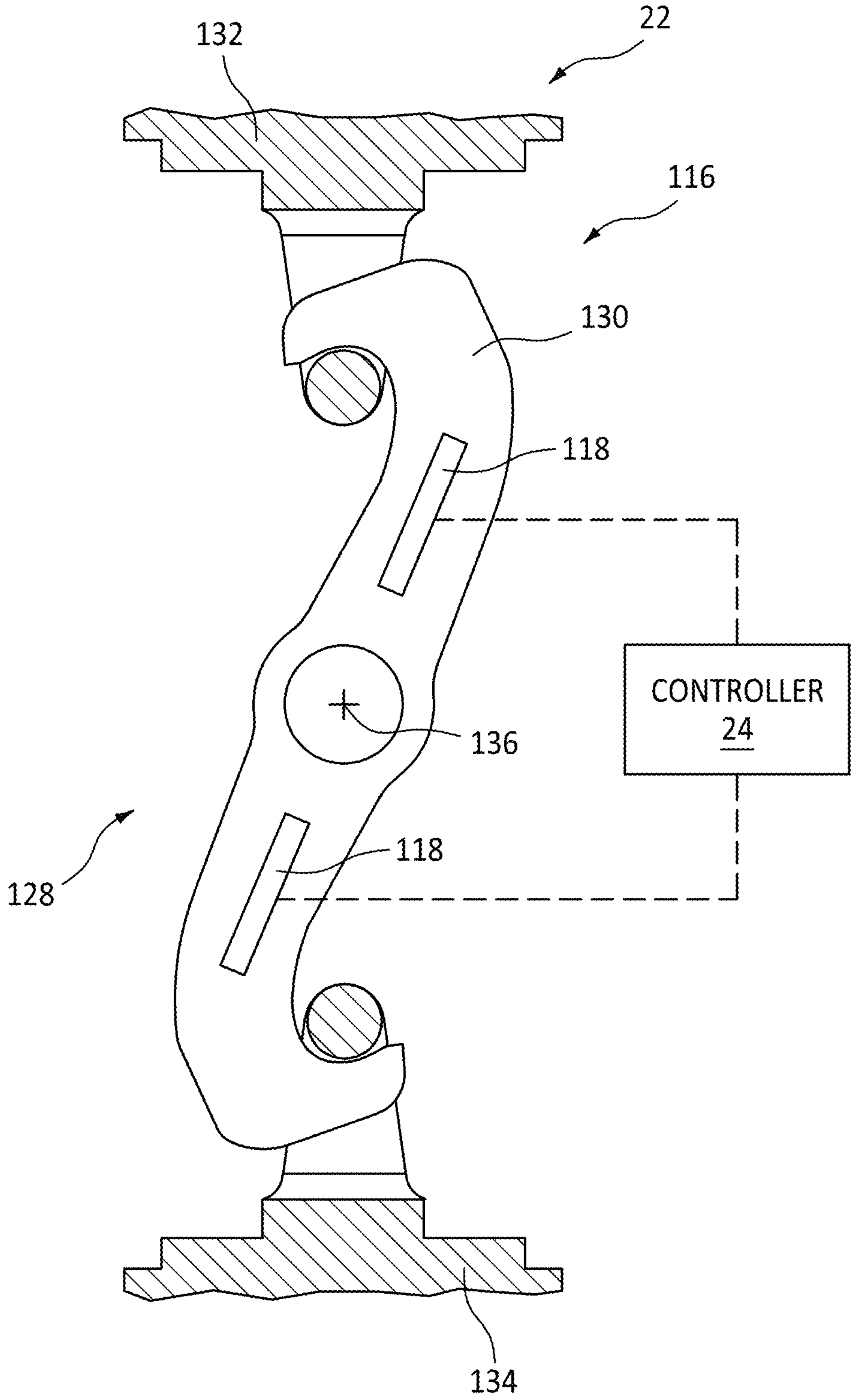
FIG. 7 schematically illustrates a S-hook lock for a locking assembly of a thrust reverser section of a propulsion system nacelle, in accordance with one or more embodiments of the present disclosure.

FIG. 7 illustrates a third example of an application of the LLPD system 116 and the load cells 118 on a portion of the nacelle 22. In particular, the LLPD system 116 of FIG. 7 may be configured for use with a clamshell-type (or bucket-type) thrust reverser assembly, however, the LLPD system 116 of FIG. 7 is not limited to use with the foregoing exemplary thrust reverser assemblies. FIG. 7 illustrates a cutaway view of a portion of a locking assembly 128 (e.g., a primary lock) for a thrust reverser. The locking assembly 128 of FIG. 7 includes an S-hook lock 130 configured to selectively engage a first thrust reverser door 132 and a second thrust reverser door 134 to lock the first thrust reverser door 132 and the second thrust reverser door 134 together in their respective stowed positions. The S-hook lock 130 is rotatable about a rotational axis 136 to engage or disengage the first thrust reverser door 132 and the second thrust reverser door 134. The load cell 118 of FIG. 7 is disposed on or embedded within the S-hook lock 130 to measure loading experienced by the S-hook lock 130 while retaining the first thrust reverser door 132 and the second thrust reverser door 134 in their respective the stowed positions. The LLPD system 116 of FIG. 7 includes two of the load cells 118, however, the present disclosure is not limited to the particular configuration of FIG. 7. Additional details of the thrust reverser locking assemblies including S-hooks may be found, for example, in U.S. Patent Publication NO. 2020/0063474, the disclosure of which is hereby incorporated herein by reference in its entirety.

Referring to FIGS. 3 and 4, the operation of the LLPD system 116 will be described in further detail. The controller 24 (e.g., the memory 112) may include instructions which, when executed by the controller 24 (e.g., the processor 110) cause the controller 24 (e.g., the processor 110) to control one or more aspects of the LLPD system 116 operation. The controller 24 may determine or otherwise receive an engine output parameter of the gas turbine engine 20. The controller 24 may compare the engine output parameter to a threshold engine output parameter value (e.g., a predetermine value). For example, the controller 24 may compare shaft 48 rotation speed (e.g., N1, N1C) to the threshold engine output parameter to identify whether the shaft 48 rotation speed is greater than or less than the threshold engine output parameter. The threshold engine output parameter may be selected to correspond to a relatively high-power output of the gas turbine engine 20 such as may be present during a takeoff condition for the propulsion system 10, where nacelle 22 structural load path loading is expected to be relatively high. For example, the threshold engine output parameter may be greater than or equal to 50 percent of the rated engine output parameter (e.g., shaft 48 rotation speed (N1, N1C)) for the gas turbine engine 20 or, in some cases, greater than or equal to 75 percent of the rated engine output parameter (e.g., shaft 48 rotation speed (N1, N1C)) for the gas turbine engine 20. The use of a threshold engine output parameter corresponding to a relatively high-power output of the gas turbine engine 20 facilitates sufficiently high structural loading at the structural load paths monitored by the LLPD system 116 relative to the zero-load structural loading at these respective structural load paths.

When the controller 24 identifies the engine output parameter is greater than the threshold engine output parameter, the controller 24 may compare a measured loading (e.g., a structural loading signal) for each of the load cells 118 at their respective structural load path positions to a zero-load value for each of the respective load cells 118 and their structural load path positions. The zero-load value for each of the load cells 118 may be a predetermined value stored in memory 112. The predetermined zero-load value may be measured or otherwise determined for each of the structural load paths and respective load cells 118 through routine experimentation or other analysis. Alternatively, the controller 24 may determine (e.g., dynamically determine) the zero-load value for each of the structural load paths and respective load cells 118. For example, the controller 24 may measure the loading at the structural load paths using the respective load cell 118 loading measurements during a low-power condition of the propulsion system 10 (e.g., ground idle, ground taxiing, minimum cruise during flight, etc.). With the engine output parameter greater than the threshold engine output parameter, the structural loading for each of the load cells 118 may be expected to be significantly greater than the zero-load value for each of the respective load cells 118. The controller 24 may identify an absence of a structural load path failure for the structural load path associated with each of the load cells 118 when the structural loading measured by each of the load cells 118 is greater than the zero-load value for each of the respective load cells 118. The controller 24 may identify a presence of a structural load path failure for the structural load path associated with each of the load cells 118 when the structural loading measured by each of the load cells 118 is less than the zero-load value for each of the respective load cells 118. In response to identifying the presence of the structural load path failure of the structural load path associated with at least one of the load cells 118, the controller 24 may generate a warning (e.g., a warning light, a warning message, an audible alarm, etc.) for a pilot or other operator of the propulsion system 10 or its associated aircraft, identifying the presence of the structural load path failure.

The present disclosure LLPD system 116 facilitates identification of latent nacelle structural load path failures during a flight condition of the propulsion system 10. Identification of the presence or absence of a structural load path failure during high-power gas turbine engine 20 operating conditions (e.g., during takeoff or other conditions in which the engine output parameter exceeds the threshold engine output parameter) provides structural load path loading conditions which are expected to greatly exceed zero-load values for the structural load paths during normal conditions, and significantly decreases the likelihood of a false positive identification of structural load path failure. As a result, time-consuming visual inspections of nacelle structural load paths may be eliminated or reduced, thereby improving aircraft operational time. By providing improved identification of latent structural load path failures, the LLPD system 116 may further facilitate the use of smaller and/or lighter weight nacelle components which will not need to be sized or otherwise selected for resistance to residual fatigue, thereby reducing nacelle weight.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An assembly for an aircraft propulsion system, the assembly comprising:
- a gas turbine engine;
- a nacelle housing the gas turbine engine;
- a load cell disposed on the nacelle, the load cell is configured to measure a loading of the nacelle at a structural load path position of the nacelle; and
- a controller connected in signal communication with the load cell, the controller includes a processor in communication with a non-transitory memory storing instructions, which instructions when executed by the processor, cause the processor to:
  - compare an engine output parameter of the gas turbine engine to a threshold engine output parameter to identify the engine output parameter is greater than or less than the threshold engine output parameter;
  - in response to identifying the engine output parameter is greater than the threshold engine output parameter, compare the measured loading of the load cell to a zero-load value for the structural load path position to identify the measured loading is greater than or less than the zero-load value; and
  - in response to identifying the measured loading is less than the zero-load value, identify a structural load path failure for the structural load path position.

2. The assembly of claim 1, wherein the instructions, when executed by the processor, further cause the processor to generate a warning for the structural load path failure at the structural load path position in response to identifying the measured loading is less than the zero-load value.

3. The assembly of claim 1, wherein the nacelle includes attachment hardware at the structural load path position, and the load cell is disposed on the attachment hardware.

4. The assembly of claim 3, wherein the nacelle includes a latch assembly and the latch assembly includes the attachment hardware.

5. The assembly of claim 1, wherein the gas turbine engine includes a rotational assembly, the rotational assembly includes a propulsor, and the engine output parameter is a rotation speed of the rotational assembly.

6. The assembly of claim 5, wherein the threshold engine output parameter is greater than or equal to 50 percent of a rated value for the rotation speed.

7. The assembly of claim 6, wherein the threshold engine output parameter is greater than or equal to 75 percent of the rated value for the rotation speed.

8. The assembly of claim 1, wherein the zero-load value is a predetermined value stored in the memory.

9. The assembly of claim 1, wherein the instructions, when executed by the processor, further cause the processor to:
- determine the zero-load value for the structural load path position using a value of the measured loading with said value of the measured loading being determined prior to determining the zero-load value and when the gas turbine engine is operating in a low-power condition.

10. A method for identifying a structural load path failure for a nacelle of an aircraft propulsion system, the method comprising:
- measuring a loading of the nacelle at a structural load path position of the nacelle;
- comparing an engine output parameter of a gas turbine engine of the aircraft propulsion system to a threshold engine output parameter to identify the engine output parameter is greater than or less than the threshold engine output parameter;
- in response to identifying the engine output parameter is greater than the threshold engine output parameter, comparing the measured loading to a zero-load value for the structural load path position to identify the measured loading is greater than or less than the zero-load value; and
- in response to identifying the measured loading is less than the zero-load value, identifying the structural load path failure for the structural load path position.

11. The method of claim 10, wherein the engine output parameter is one of a rotation speed, a torque, a shaft horsepower, a temperature, or a fuel flow rate for the gas turbine engine.

12. The method of claim 10, wherein measuring the loading of the nacelle at the structural load path position of the nacelle includes measuring the loading of the nacelle at the structural load path position using a load cell disposed at the structural load path position.

13. The method of claim 12, further comprising determining the zero-load value for the structural load path position using a value of the measured loading with said value of the measured loading being determined prior to determining the zero-load value and when the gas turbine engine is operating in a low-power condition.

14. The method of claim 10, further comprising generating a warning for the structural load path failure at the structural load path position in response to identifying the measured loading is less than the zero-load value.

* * * * *